(12) United States Patent
Lankehanumaiah et al.

(10) Patent No.: US 11,520,323 B2
(45) Date of Patent: Dec. 6, 2022

(54) 360° ASSISTANCE FOR QCS SCANNER WITH MIXED REALITY AND MACHINE LEARNING TECHNOLOGY

(71) Applicant: Honeywell Limited, Mississauga (CA)

(72) Inventors: Pavan Tumkur Lankehanumaiah, Bangalore (IN); Shailendra Kumar Gupta, Bangalore (IN); Senthilkumar Jayaraman, Salem District (IN); Ajay Kumar, Bangalore (IN)

(73) Assignee: Honeywell Limited, Mississauga (CA)

( * ) Notice: Subject to any disclaimer, the term of this patent is extended or adjusted under 35 U.S.C. 154(b) by 943 days.

(21) Appl. No.: 16/297,285

(22) Filed: Mar. 8, 2019

(65) Prior Publication Data

US 2020/0285225 A1   Sep. 10, 2020

(51) Int. Cl.
*G05B 23/02* (2006.01)
*G05B 19/4063* (2006.01)
(Continued)

(52) U.S. Cl.
CPC ....... *G05B 23/0205* (2013.01); *G05B 19/401* (2013.01); *G05B 19/4063* (2013.01); *G06N 20/00* (2019.01); *G05B 2219/32014* (2013.01)

(58) Field of Classification Search
CPC .............. G05B 23/0205; G05B 19/401; G05B 19/4063; G05B 2219/32014; G06N 20/00
(Continued)

(56) References Cited

U.S. PATENT DOCUMENTS 7,787,992 B2   8/2010  Pretlove et al.
9,739,012 B1   8/2017  Forbes
(Continued)

FOREIGN PATENT DOCUMENTS

CN   207259864 U     4/2018
EP   3285182 A1 *   2/2018 ............. G06F 16/41

OTHER PUBLICATIONS

Valmet Forward, "Augmented Reality Re-defines Predictive Maintenance", https://www.valmet.com/media/articles/all-articles/augmented-reality-re-defines-predictive-maintenance/, Feb. 4, 2019, 5 pages.

*Primary Examiner* — Hien D Khuu
(74) *Attorney, Agent, or Firm* — Paschall & Associates, LLC; James C. Paschall (57) ABSTRACT

An apparatus, method, and non-transitory machine-readable medium provide for 360° assistance for a QCS scanner with mixed reality (MR) and machine learning technology. The apparatus includes an optical sensor, a display, a Chatbot, cloud service, and a processor operably connected to the optical sensor and the display. The processor receives diagnostic information from a server related to a field device in an industrial process control and automation system; identifies an issue of the field device based on the diagnostic information; detects, using the optical sensor, the field device corresponding to the identified issue; guides, using the display, a user to a location and a scanner part of the field device that is related to the issue; provides, using the display, necessary steps or actions to resolve the issue; and connects, using a cloud server, a user to get modules of installation, commissioning, annual maintenance (AMC) and training for a quality control system (QCS) as per the selected persona.

17 Claims, 9 Drawing Sheets

(51) Int. Cl.
*G06N 20/00* (2019.01)
*G05B 19/401* (2006.01)

(58) Field of Classification Search
USPC .......................................... 700/26; 702/783
See application file for complete search history.

(56) References Cited

U.S. PATENT DOCUMENTS

| | | | |
|---|---|---|---|
| 2015/0046125 A1* | 2/2015 | Jagiella | G06K 7/10297 |
| | | | 702/184 |
| 2018/0089870 A1 | 3/2018 | Billi-Duran et al. | |
| 2018/0130260 A1* | 5/2018 | Schmirler | G06F 3/011 |
| 2020/0257585 A1* | 8/2020 | Balasubramanian | |
| | | | G06F 11/0709 |

* cited by examiner

360° ASSISTANCE FOR QCS SCANNER WITH MIXED REALITY AND MACHINE LEARNING TECHNOLOGY

TECHNICAL FIELD

This disclosure relates generally to autonomous operating industrial plants. More specifically, this disclosure relates to systems and methods for 360° assistance for a quality control system (QCS) scanner with mixed reality (MR) and machine learning technology.

BACKGROUND

Installation, upgrade, maintenance of QCS scanner requires skilled domain expertise since it involves handling of a radioactive source, precise work with sequence of procedural steps, and should be error free. The people in the industry with the expertise dealing with the QCS scanner are growing older and reaching retirement. New TAC and service regions are facing difficulties supporting the QCS scanner due to a competency gap and lack of expertise of knowledge. The troubleshooting of the QCS scanner requires domain expertise to identify a potential issue precisely and to fix the potential issue. Also, the time required to rectify the issue may vary depending on the field expertise. The training of the QCS scanner requires time on a physical scanner and physical environment for training purposes.

SUMMARY

This disclosure provides systems and methods for 360° assistance for a QCS scanner with mixed reality (MR) and machine learning technology.

In a first embodiment, an apparatus provides for 360° assistance for a QCS scanner with mixed reality (MR) and machine learning technology. The apparatus includes an optical sensor, a display and a processor operably connected to the optical sensor and the display. The processor receives diagnostic information from a server related to a field device in an industrial process control and automation system; identifies an issue of the field device based on the diagnostic information; detects, using the optical sensor, the field device corresponding to the identified issue; guides, using the display, a user to a location and a scanner part of the field device that is related to the issue; and provides, using the display, necessary steps or actions to resolve the issue.

In a second embodiment, a method provides for 360° assistance for a QCS scanner with mixed reality (MR) and machine learning technology. The method includes receiving diagnostic information from a server related to a field device in an industrial process control and automation system; identifying an issue of the field device based on the diagnostic information; detecting, using the optical sensor, the field device corresponding to the identified issue; guiding, using the display, a user to a location and a scanner part of the field device that is related to the issue; and providing, using the display, necessary steps or actions to resolve the issue.

In a third embodiment, a non-transitory medium provides for 360° assistance for a QCS scanner with mixed reality (MR) and machine learning technology. The instructions cause one or more processors to receive diagnostic information from a server related to a field device in an industrial process control and automation system; identify an issue of the field device based on the diagnostic information; detect, using the optical sensor, the field device corresponding to the identified issue; guide, using the display, a user to a location and a scanner part of the field device that is related to the issue; and provide, using the display, necessary steps or actions to resolve the issue.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

Figure 1:
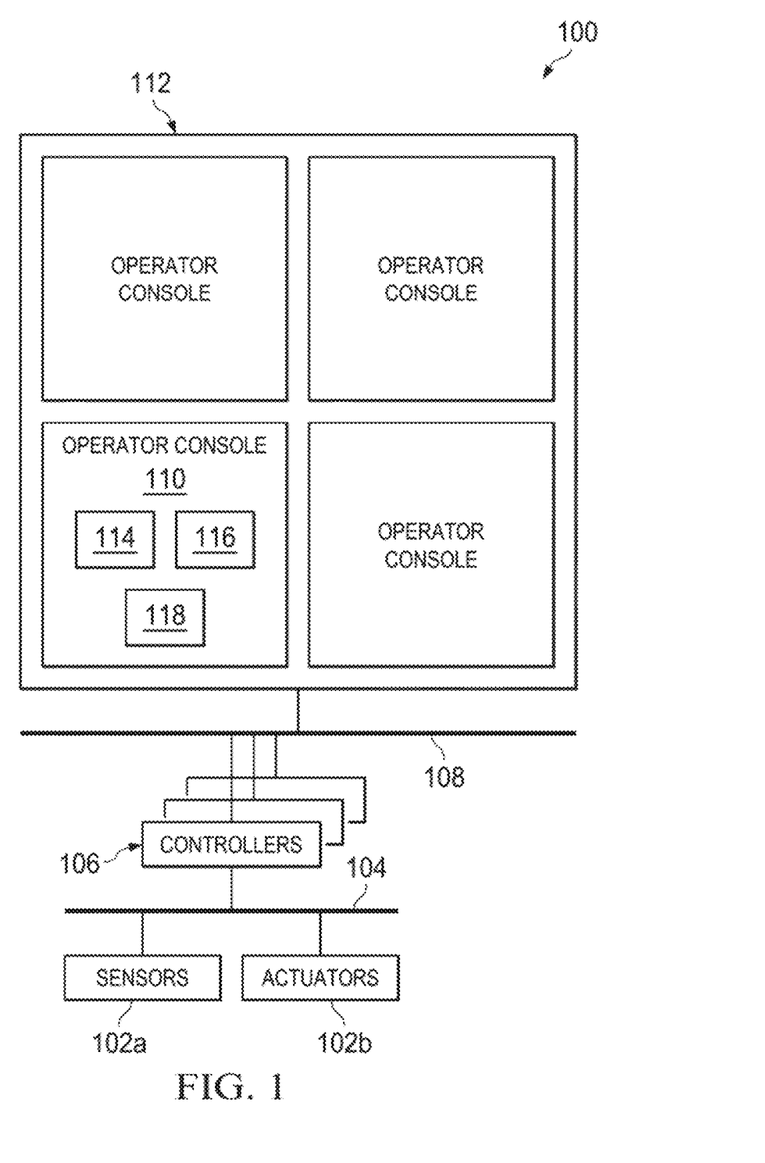
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as pressure, temperature, flow rate, basis weight, moisture, ash, caliper, etc. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network, electrical signal network (such as a HART or FOUNDATION FIELDBUS network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions.

Controllers 106 are often arranged hierarchically in a system. For example, different controllers 106 could be used to control individual actuators, collections of actuators forming machines, collections of machines forming units, collections of units forming plants, and collections of plants forming an enterprise. A particular example of a hierarchical arrangement of controllers 106 is defined as the "Purdue" model of process control. The controllers 106 in different hierarchical levels can communicate via one or more networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as Robust Multivariable Predictive Control Technology (RMPCT) controllers or other types of controllers implementing model predictive control or other advanced predictive control. As a particular example, each controller 106 could represent a computing device running a real-time operating system, a WINDOWS operating system, or other operating system.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving setpoints or control modes for process variables controlled by the controllers 106 or other information that alters or affects how the controllers 106 control the industrial process.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

Each operator console 110 includes any suitable structure for displaying information to and interacting with an operator. For example, each operator console 110 could include one or more processing devices 114, such as one or more processors, microprocessors, microcontrollers, field programmable gate arrays, application specific integrated circuits, discrete logic devices, or other processing or control devices. Each operator console 110 could also include one or more memories 116 storing instructions and data used, generated, or collected by the processing device(s) 114. Each operator console 110 could further include one or more network interfaces 118 that facilitate communication over at least one wired or wireless network, such as one or more Ethernet interfaces or wireless transceivers.

In accordance with this disclosure, a technique is provided for 360° assistance for a QCS scanner with mixed reality (MR) and machine learning technology. One or more components of the system 100 (e.g., an operator console 110) could be configured to perform one or more operations associated with this technique.

Although FIG. 1 illustrates one example of an industrial process control and automation system 100, various changes may be made to FIG. 1. For example, industrial control and automation systems come in a wide variety of configurations. The system 100 shown in FIG. 1 is meant to illustrate one example operational environment in which a pressure sensor could be used.

Figure 2:
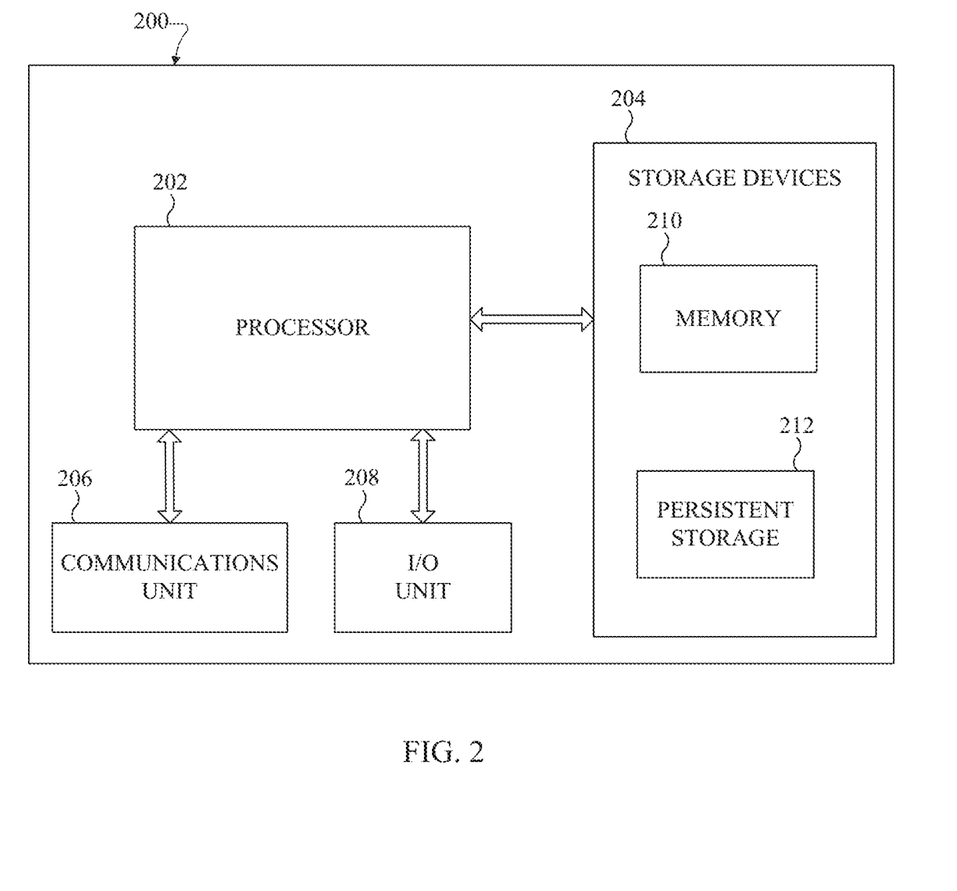
FIG. 2 illustrates an example device for 360° assistance for a QCS scanner with mixed reality (MR) and machine learning technology according to this disclosure.

FIG. 2 illustrates an example device for 360° assistance for a QCS scanner with mixed reality (MR) and machine learning technology according to this disclosure. In particular, FIG. 2 illustrates an example computing device 200. In some embodiments, the computing device 200 could denote an operator station, server, a remote server or device, or a mobile device. The computing device 200 could be used to run applications. For ease of explanation, the computing device 200 is described as being used in the system 100 of FIG. 1, although the device could be used in any other suitable system (whether or not related to industrial process control and automation).

As shown in FIG. 2, the computing device 200 includes at least one processor 202, at least one storage device 204, at least one communications unit 206, and at least one input/output (I/O) unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) configured to store and facilitate retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read-only memory, hard drive, Flash memory, or optical disc.

The communications unit 206 supports communications with other systems or devices. For example, the communications unit 206 could include at least one network interface card or wireless transceiver facilitating communications over at least one wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, gesture control, image processing, or other suitable input device. The I/O unit 208 may also send output to a display, printer, or other suitable output device.

Figure 3:
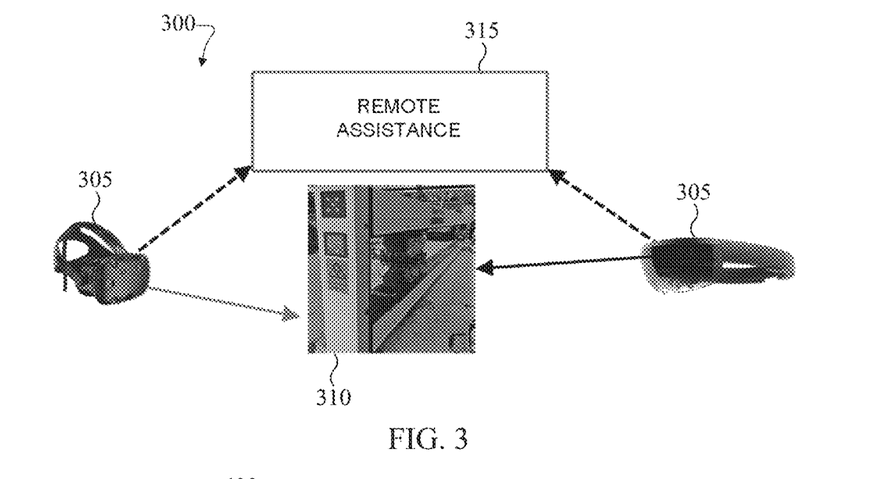
FIG. 3 illustrates an exemplary QCS scanner system of a 360° assistance for a QCS scanner with mixed reality (MR) and machine learning technology according to this disclosure.

FIG. 3 illustrates an exemplary QCS scanner system 300 of 360° assistance for a QCS scanner 310 with mixed reality (MR) and machine learning technology according to this disclosure. The embodiment of the exemplary QCS scanner system 300 illustrated in FIG. 3 is for illustration only. FIG. 3 does not limit the scope of this disclosure to any particular implementation.

The QCS scanner system 300 provides for a mixed reality (MR) (augmented reality (AR)/virtual reality (VR), machine learning and Chatbot solutions resolving potential issues. Using the MR, the commission of the QCS system 300 is made safer, easier and more user friendly by augmenting the physical conditions with interactive guidance for installation and upgrading of the QCS scanners.

The QCS system 300 integrates QCS scanner diagnostic messages and fault information with the HoloLens 305. The QCS system 300 receives the solution from a local/centralized solution center and enabling an interactive Chatbot and machine learning for troubleshooting.

The QCS system creates a virtual training for the QCS scanner using VR and AR, which reduces the overall cost of training and physical hardware. The QCS system provides instruction on safe handling of a radioactive source under a hazardous environment. The QCS system creates a mimic of scanner components, which provides the detail information about wiring details, equipment location identification, checkpoints and more.

The AR solution provides an augmented physical scanner with real time data for troubleshooting. The AR solution augments the step-by-step procedure for installing a QCS scanner. The AR solution can upload real-time scanner status.

The machine learning and Chatbot 315 provides a solution for easy troubleshooting based on previous data with interactive live chat sessions with machine and expert chanters. The machine learning and Chatbot 315 can record the issue and their resolving steps for future use.

The VR solution can provide an alternate means for practicing installation and commissioning of QCS scanner without the need for access to an expensive physical component. The VR solution can mimic QCS scanner scenarios like real system training of troubleshooting, and can show live status and tips of the QCS system.

The term "360° assistance" of QCS Scanner refers to an overall support of QCS scanner. Four major modules of QCS scanner with respect to support are Module 1: Troubleshooting of QCS scanner issues during on process; Module 2: Training; Module 3: Installation and commissioning of QCS scanner; and Module 4: Annual maintenance/periodic checks. All mentioned modules of QCS scanner support require different/combination of technologies and different approaches to achieve the standardized, time-bound, predictable and robustness in the process.

Figure 4:
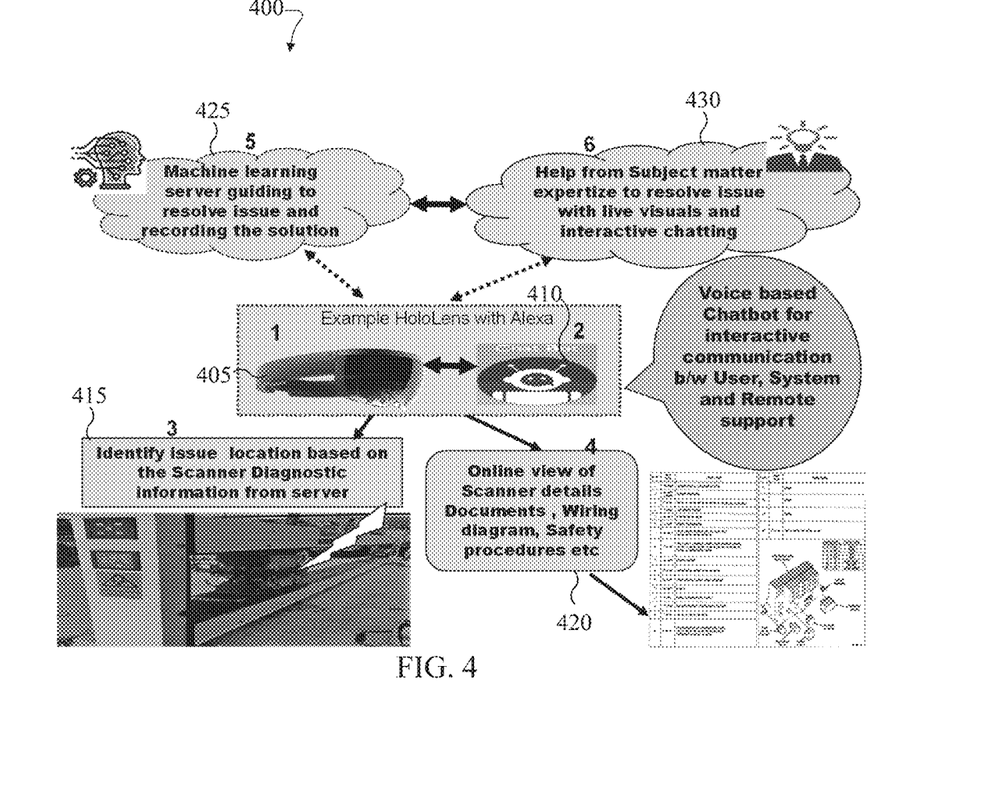
FIG. 4 illustrates an exemplary QCS scanner troubleshooting technique with augmented reality, Chatbot, and machine learning technology according to the embodiments of the present disclosure.

FIG. 4 illustrates an exemplary QCS scanner troubleshooting technique 400 with augmented reality, Chatbot, and machine learning technology according to the embodiments of the present disclosure. The embodiment of the exemplary QCS scanner troubleshooting technique 400 illustrated in FIG. 4 is for illustration only. FIG. 4 does not limit the scope of this disclosure to any particular implementation.

The QCS troubleshooting technique 400 includes a HoloLens 405, a Chatbot 410, an issue identification 415, an eDocumentation 420, a machine learning server 425, and an expert support 430. The HoloLens 405 is a holographic computer made to identify the QCS scanner and its internal parts, virtual wiring layout, connection identification, scanner mechanical parts identification and more based on the scanner version also capable of video streaming the scanner for remote assistant.

The Chatbot 410 can provide an interactive voice based Chatbot technology that accepts the voice input from user and provides the necessary output to guide the user to perform the necessary actions.

The issue identification 415 involves integrating the HoloLens with the QCS server and QCS scanner to provide scanner related diagnostics based on the diagnostic information. The HoloLens can guide the user to a location or scanner part where the issue occurred and can provide necessary steps or action to be performed to resolve the issue.

The eDocumentation 420 provides the HoloLens the ability to identify an object and provide information related to the object, e.g. a wiring diagram, mechanical connections, test points, and more. The eDocumentation also provides receive any document a user requests with the help of the Chatbot, which will reduce searching times, data availability, and improve the user experience. The HoloLens can identify an object related to a field device. The user can provide a command that the HoloLens receives using an audio sensor or from an external device. The HoloLens displays a document corresponding to the document type of the identified object.

The machine-learning server 425 is a cloud service provided to resolve the issue based on a criticality of the issue. The user can connect to the machine learning server using the Chatbot, can request a solution, can provide the solution based on previous occurrences of similar issues, and can record the steps of procedure followed to resolve the current issues through which the system can provide a more robust and accurate solution in the future.

The expert support 430 is used if the machine-learning server is not able to resolve the issue and a user needs expert support. The HoloLens can request the machine-learning server to connect to an available expert. Once connected with an expert, the expert can explain the issue with actual visuals of the issue in order to resolve the issue. Once the issue is resolved, the machine-learning server can record the steps performed to resolve the issue.

Figure 5:
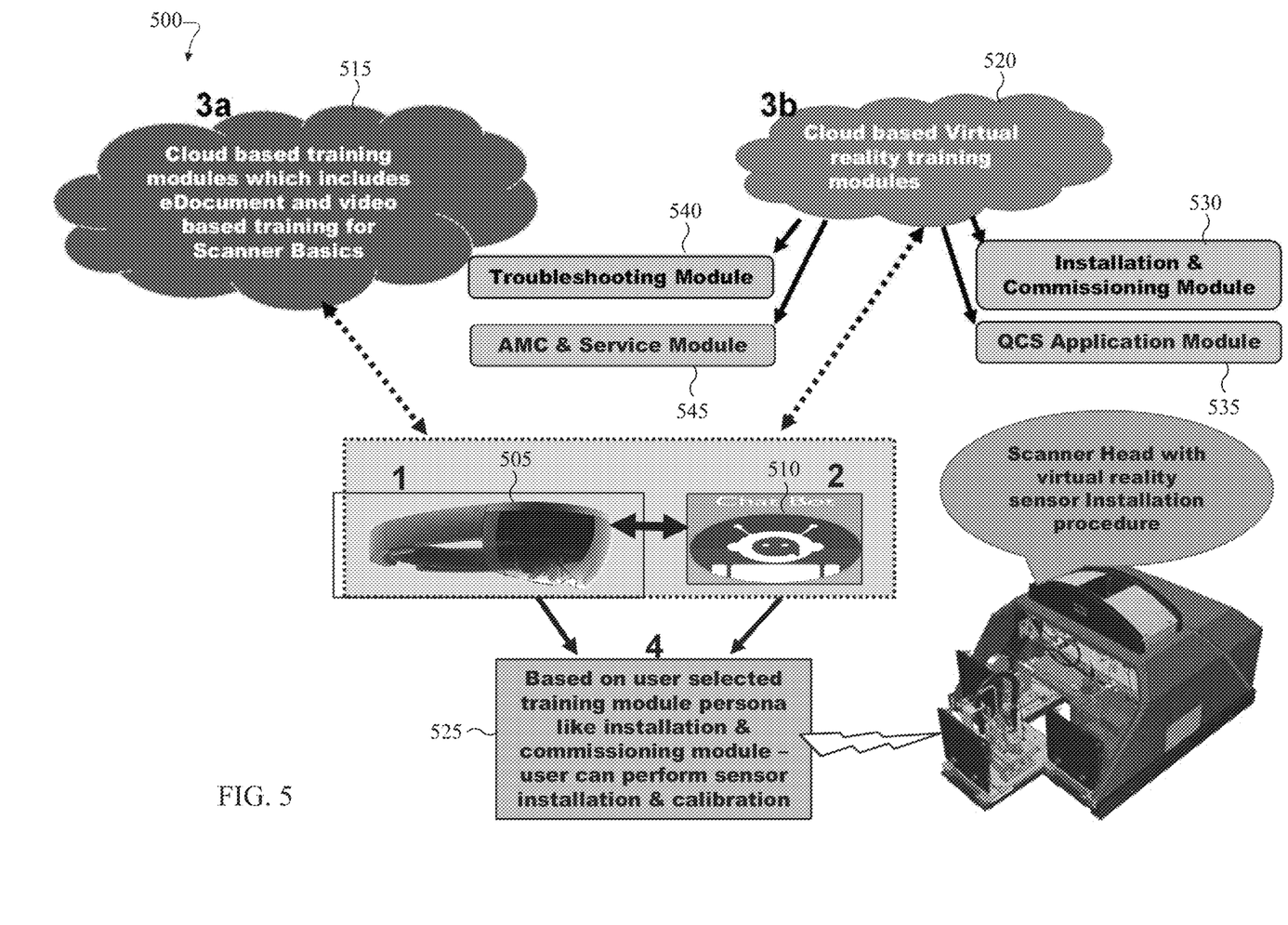
FIG. 5 illustrates an exemplary QCS scanner training with virtual reality and Chatbot technology according to the embodiments of the present disclosure.

FIG. 5 illustrates an exemplary QCS scanner training system 500 with virtual reality and Chatbot technology according to the embodiments of the present disclosure. The embodiment of the exemplary QCS scanner training 500 illustrated in FIG. 5 is for illustration only. FIG. 5 does not limit the scope of this disclosure to any particular implementation.

The QCS training 500 includes a HoloLens 505 with a Chatbot 510, cloud based training manuals including cloud-based eDocument & video training 515 and cloud based virtual training module 520, and virtual training 525.

The wearable or HoloLens 505 is a holographic computer that can mimic the QCS scanner in a virtual world that can image the virtual QCS scanner. The HoloLens 505 can show how the physical scanner looks and can show internal parts that can be virtually imaged to aide in user learning for different components (e.g. sensors, mechanics, hardware, and software configurations) before going an actual scanner goes live.

The Chatbot 510 is an interactive voice-based Chatbot that accepts a voice input from a user and can provide a necessary output to guide the user to perform necessary actions for resolving an issue.

The cloud-based eDocument & video training 515 can cover a basic introduction of the QCS scanner and the industrial uses. The cloud-based virtual training modules 520 can cover insights of the QCS scanner, sensors, mechanics, hardware and software configurations, handling, service, and troubleshooting. Examples of training modules can include an installation and commissioning module 530, a QCS application module 535, a troubleshooting module 540, an AMC & service module 545, etc.

The virtual training 525 is used when the user is wearing the HoloLens and connects to the cloud-based training modules. The HoloLens selects a persona of the training module. Using virtual reality, the Chatbot user can commission, troubleshoot, view plant scenario usage without the use of or access to a physical scanner.

Figure 6:
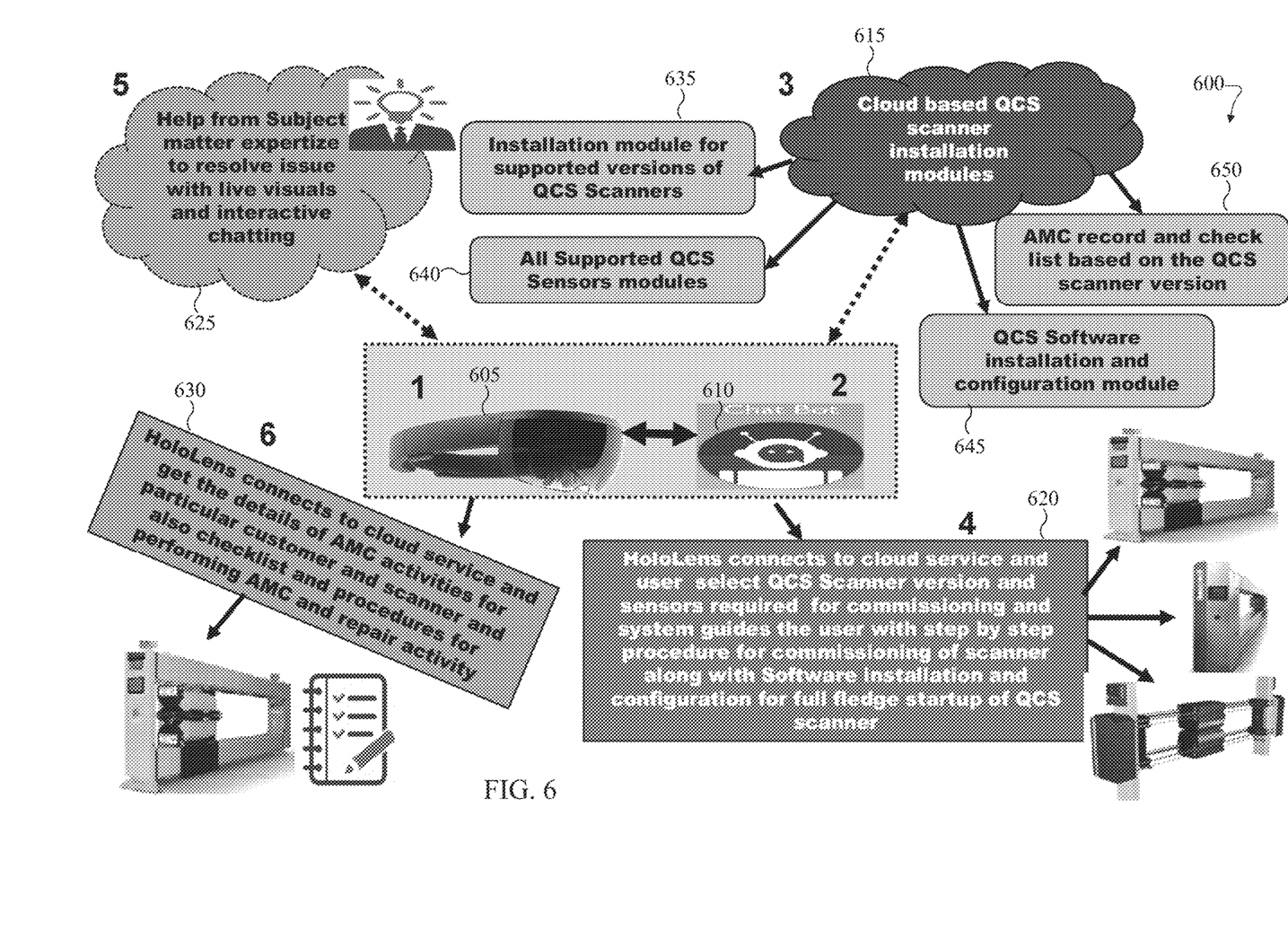
FIG. 6 illustrates an exemplary installation, commissioning and AMC of QCS scanner using augmented reality and Chatbot technology according to the embodiments of the present disclosure.

FIG. 6 illustrates an exemplary installation, commissioning and AMC system 600 of QCS scanner using augmented reality and Chatbot technology according to the embodiments of the present disclosure. The embodiment of the exemplary system 600 of QCS scanner illustrated in FIG. 6 is for illustration only. FIG. 6 does not limit the scope of this disclosure to any particular implementation.

The system 600 of the QCS scanner includes installation, commissioning and annual maintenance contract (AMC). The system 600 includes a HoloLens 605 with a Chatbot 610, a cloud-based installation & AMC module 615, installation and commissioning 620, expert support 625, and AMC activities 630.

The HoloLens 605 is a holographic computer made to identify a site location and provide prerequisite conditions and checks for installing a QCS scanner. The HoloLens 605 can guide the user during installation and commissioning of the QCS scanner, various sensors, and internal parts using augmented reality. The HoloLens can enable the remote assistant for expert advice.

The Chatbot 610 is an interactive voice-based chatbot that can accept the voice input from the user and can provide necessary outputs to guide the user to perform the necessary action for resolving an issue.

The cloud-based installation & AMC module 615 includes different modules that can be accessed based on requirements from the cloud that are largely classified in sub-modules. The sub-modules include an installation module 635 for supporting various versions of QCS scanners, QCS sensor module 640, QCS software installation and configuration module 645, AMC activities for QCS scanner module 650, etc.

The installation and commissioning 620 includes the HoloLens connecting to a cloud service. The HoloLens selects a QCS scanner version and sensors available for commissioning. The installation and commissioning 620 can guide the HoloLens with step by step procedures for commissioning the QCS scanner along with software installation and configuration for a full fledge startup of the QCS scanner.

The expert support 625 can provide the HoloLens with expert support for installation, commissioning, and AMC if a user cannot figure out a part of the process or an issue with the QCS scanner. The HoloLens can connect with an expert and provide a visual of the QCS scanner while the in conversation with a user of the HoloLens. The expert can control the HoloLens to indicate components to the user. That way, the expert can better explain the step or procedure of resolving an issue.

The AMC activities 630 are based on a customer record system that can create an AMC checklist. The AMC activities 630 can control the HoloLens to guide the user to perform the ACM activity that enables an engineer to collect on-the-go reports of the activity and comments. The HoloLens can generate the final report of the AMC activity for the customer and user records.

Figure 7A:
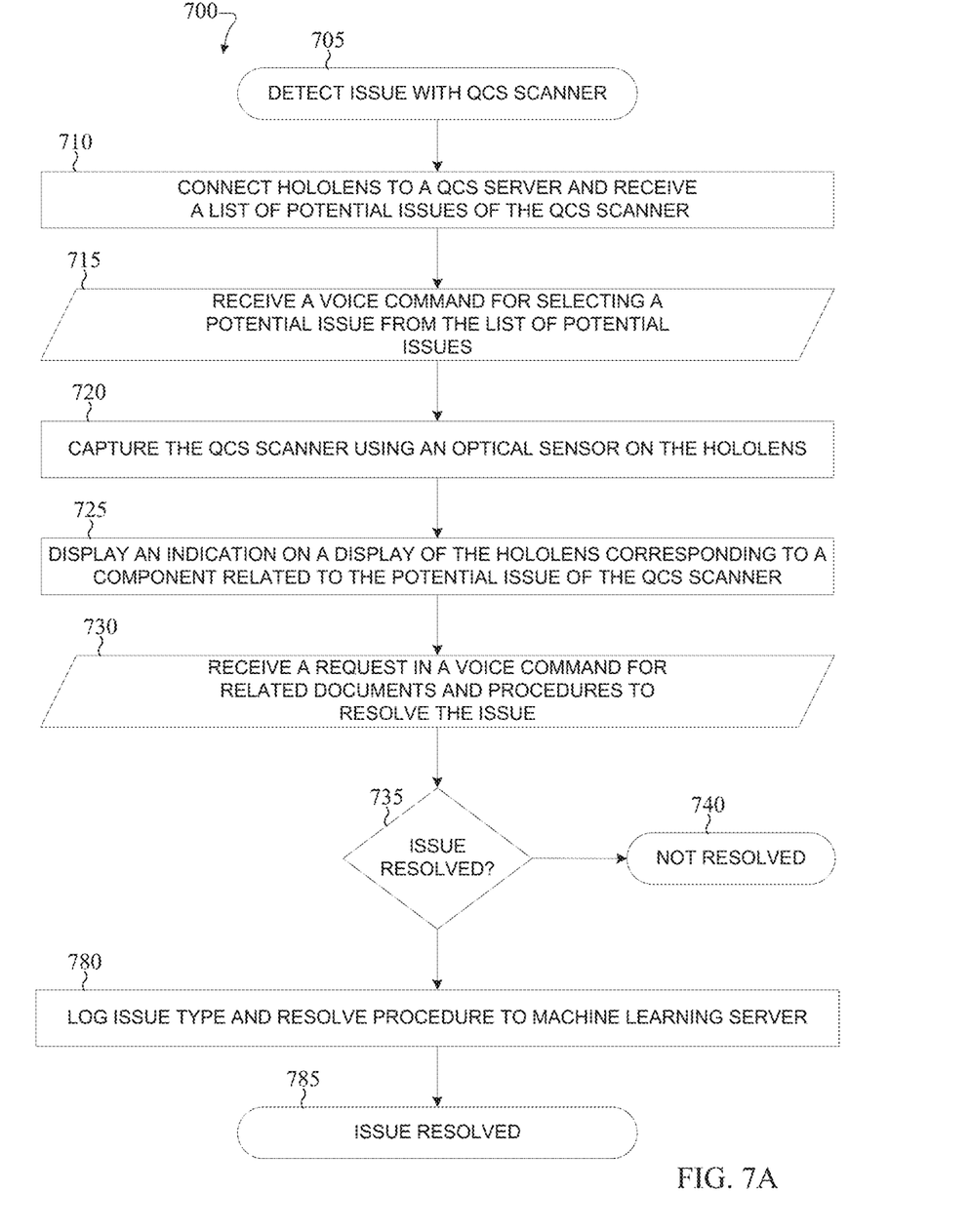
FIGS. 7A and 7B illustrate an exemplary flowchart for troubleshooting a QCS scanner issue using augmented reality, Chatbot, and machine learning technology according to embodiments of the present disclosure.
Figure 7B:
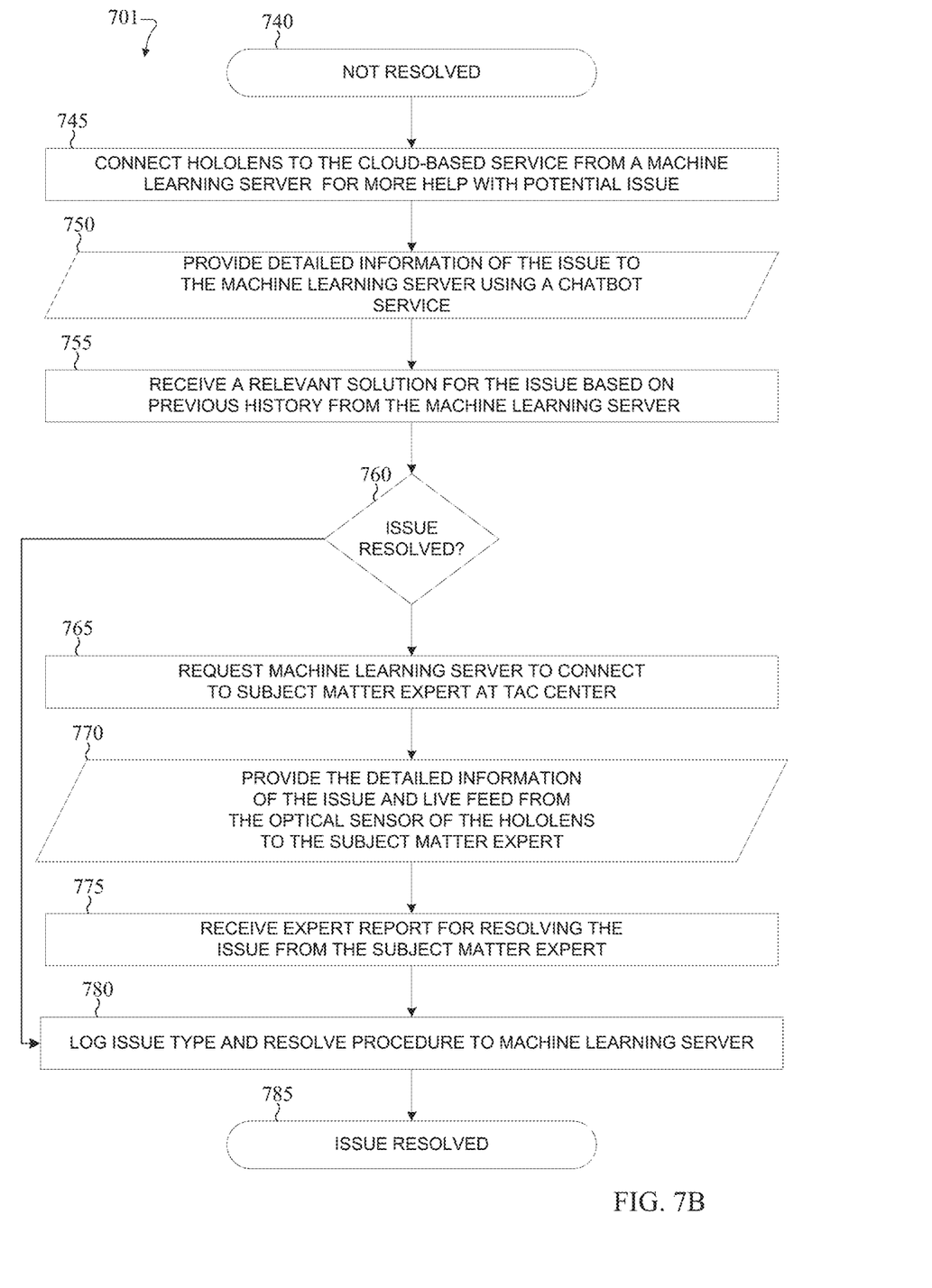

FIGS. 7A and 7B illustrate an exemplary method 700, 701 for troubleshooting a QCS scanner issue using augmented reality, Chatbot, and machine learning technology according to embodiments of the present disclosure. For example, the method described in FIGS. 7A and 7B may be performed in conjunction with the computing device 200 in FIG. 2.

In operation 705, the computing device 200 can detect an issue with the QCS scanner. In certain embodiments, the computing device 200 detecting an issue includes receiving diagnostic information from a server related to a field device, such as a QCS scanner, in an industrial process control and automation system. An issue with the field device includes any malfunction that causes the field device to not function at a suitable operational requirement.

In operation 710, the computing device 200 can connect to a QCS server and receive a list of potential issues. The list of potential issues can include typical issues that have been identified on the particular machine itself or from a common malfunction list of the device type.

In operation 715, the computing device 200 can receive a voice command for selecting a potential issue from the list of potential issues. The list of potential issues can be display on the display or provided as audio outputs to the user. In certain embodiments, the computing device 200 can identify an issue of the field device based on the diagnostic information.

In operation 720, the computing device 200 can capture the QCS scanner using an optical sensor on the HoloLens. The computing device 200 can detect the field device corresponding to the identified issue using the optical sensor. Once the field device is captured and detected, the computing device can identify specific components that correspond to the identified issue.

In operation 725, the computing device 200 can display an indication on a display of the HoloLens corresponding to a component related to the potential issue of the QCS scanner. The computing device 200 can guide, using the display, a user to a location and a scanner part of the field device that is related to the issue.

In operation 730, the computing device 200 can receive a request in a voice command for related documents and procedures to resolve the issue. The computing device 200 can provide the necessary steps or action to resolve the issue. The necessary steps or actions can be displayed on the display. Specific components related to steps in the procedure can be highlighted or marked on the display with any related documents. The computing device 200 can display the related documents on the display away from the highlighted or marked components.

In operation 735, the computing device 200 can determine whether an issue is resolved. If the issue is resolved, the computing device 200 proceeds to operation 780. If the issue is not resolved, the computing device 200 proceeds to operation 740.

In operation 740, the computing device 200 can detect that the issue is not resolved. The computing device 200 can receive operating data from the QCS server and determine that the field device is still not operating efficiently.

In operation 745, the computing device 200 can connect the HoloLens to the cloud-based service on a machine-learning server for additional help with the potential issue. The cloud-based service can be directly related to a specific component.

In operation 750, the computing device 200 can provide detailed information of the issue to the machine-learning server using a Chatbot service. The detailed information can include the information of the field device from the QCS server along with any information captured by the computing device 200. The information captured by the computing device can include a live feed or frames captured from the optical sensor, audio captured from the user, frames captured from the display of the process used to fix the issue, etc.

In operation 755, the computing device 200 can receive a relevant solution for the issue based on a previous history from the machine-learning server. The previous history includes issues resolved from the field device previously, as well as other field devices of the same type. The machine-learning server can provide an optimal solution based on all the input data or different alternative options.

In operation 760, the computing device 200 can determine whether the issue is resolved. If the issue is resolved, the computing device 200 proceeds to operation 780. If the issue is not resolved, the computing device 200 proceeds to operation 765.

In operation 765, the computer device 200 can request the machine-learning server to connect to a subject matter expert at a technical assistance center (TAC) center. The subject matter expert can be an individual that is experienced with the specific type of field device or an individual that has dealt with the specific issue.

In operation 770, the computing device 200 can provide the detailed information of the issue and a live feed from the optical sensor of the HoloLens to the subject matter expert. The subject matter expert can be connected to live or sent the relevant information related to the field device.

In operation 775, the computing device 200 can receive an expert report for resolving the issue from the subject matter expert. The expert report can include step-by-step instructions for resolving the issue. In each step, different components that correspond to the respective step can be highlighted or have a marker placed on the display for identification.

In operation 780, the computing device 200 can log the issue type and resolve procedure to the machine-learning server. The issue type and resolve procedure can be related to a specific component or assembly of components, or related to a malfunction of the field device. In operation 785, the computing device 200 determines that the issue has been resolved.

Although FIGS. 7A and 7B illustrates one example of a method 700, 701 for 360° assistance for a QCS scanner with mixed reality (MR) and machine learning technology, various changes may be made to FIG. 7. For example, various steps shown in FIG. 7 could overlap, occur in parallel, occur in a different order, or occur any number of times.

Figure 8A:
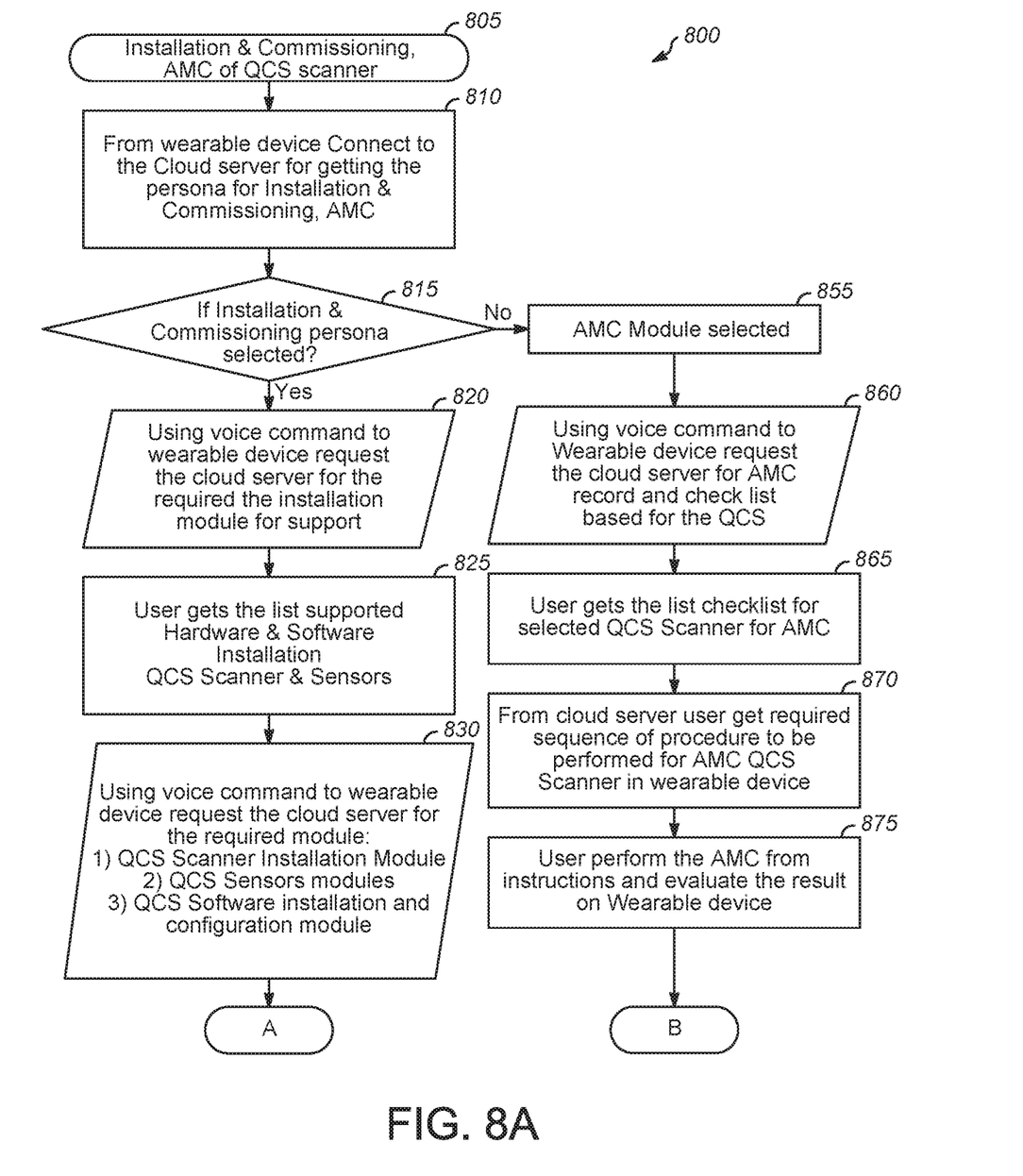
FIGS. 8A and 8B illustrate an exemplary flowchart for installation and commissioning according to the embodiment of the present disclosure.
Figure 8B:
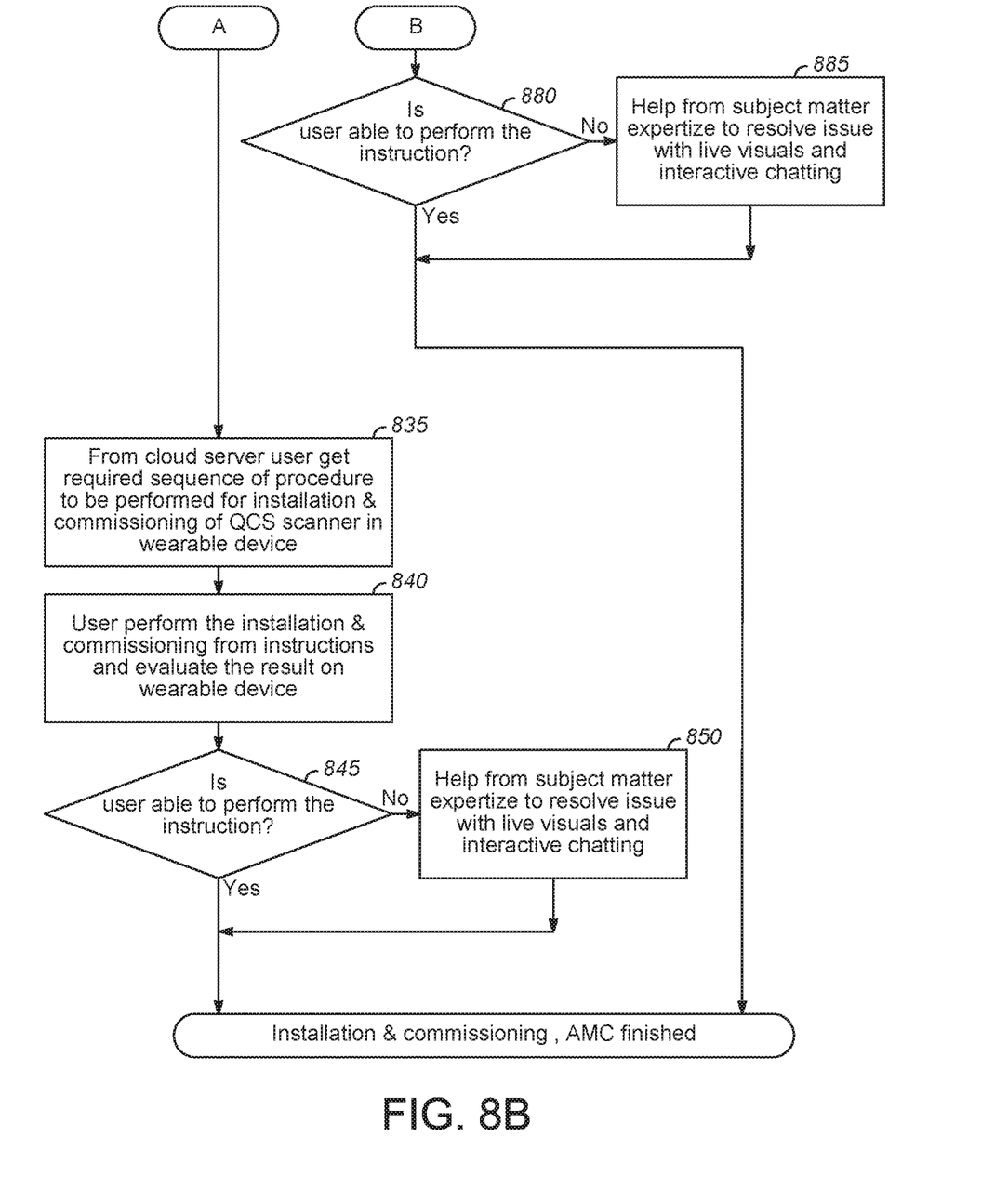

FIGS. 8A and 8B illustrate an exemplary flowchart for installation and commissioning according to the embodiment of the present disclosure. For example, the method described in FIGS. 8A and 8B may be performed in conjunction with the installation, commissioning and AMC system 600 in FIG. 6.

In operation 805, the installation, commissioning and AMC system 600 can begin the installation, commissioning, and AMC system of a QCS scanner.

In operation 810, the installation, commissioning and AMC system 600, from the wearable device, can connect to the cloud server for getting the persona for installation, commissioning, and AMC.

In operation 815, the installation, commissioning and AMC system 600 can determine whether installation and commissioning persona is selected.

In operation 820, the installation, commissioning and AMC system 600, using a voice command to the wearable device, can request the cloud server for the required installation module for support version of QCS scanner.

In operation 825, the installation, commissioning and AMC system 600 can get the list supported hardware and software installation for the QCS scanner and sensors.

In operation 830, the installation, commissioning and AMC system 600, using the voice command to wearable, can request the cloud server for the required module, including a QCS scanner installation module, QCS sensors modules, and QCS software installation and configuration module.

In operation 835, the installation, commissioning and AMC system 600, from the cloud server, can receive a required sequence of a procedure to be performed for installation and commissioning of QCS scanner in wearable device.

In operation 840, the installation, commissioning and AMC system 600 can perform the installation and commissioning from instructions and can evaluate the result on the wearable device.

In operation 845, the installation, commissioning and AMC system 600 can determine if the user is able to perform the instruction or set of instructions.

In operation 850, the installation, commissioning and AMC system 600 can receive help from subject matter expertise to resolve an issue with live visual and interactive chatting.

In operation 855, the installation, commissioning and AMC system 600 can select the AMC module.

In operation 860, the installation, commissioning and AMC system 600, using a voice command to the wearable device, can request the cloud server for an AMC record and checklist based on the QCS scanner version.

In operation 865, the installation, commissioning and AMC system 600 can receive the list checklist for a selected QCS scanner for AMC.

In operation 870, the installation, commissioning and AMC system 600, from the cloud server, can receive required sequence of procedure to be performed for AMC QCS scanner in a wearable device.

In operation 875, the installation, commissioning and AMC system 600 can perform the AMC from the instruction and evaluate the result on the wearable device.

In operation 880, the installation, commissioning and AMC system 600 determines whether the user is able to perform the instructions.

In operation 885, the installation, commissioning and AMC system 600 can receive help from a subject matter expert to resolve issues with live visual and interactive chatting.

Although FIGS. 8A and 8B illustrates one example of a method 800, 801 for 360° assistance for a QCS scanner with mixed reality (MR) and machine learning technology, various changes may be made to FIG. 8. For example, various steps shown in FIG. 8 could overlap, occur in parallel, occur in a different order, or occur any number of times.

It may be advantageous to set forth definitions of certain words and phrases used throughout this patent document. The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   an optical sensor;
   a display; and
   a processor operably connected to the optical sensor and the display, the processor configured to:
      receive diagnostic information from a server related to a field device in an industrial process control and automation system;
      identify an issue of the field device based on the diagnostic information;
      detect, using the optical sensor, the field device corresponding to the identified issue;
      guide, using the display, a user to a location and a scanner part of the field device that is related to the issue;
      provide, using the display, necessary steps or actions to resolve the issue;
      connect, using a cloud server, the user to get modules of installation, commissioning, annual maintenance (AMC) and training for a quality control system (QCS) as per a selected persona; and
      when the necessary steps or actions do not resolve the issue, the processor is further configured to:
         provide detailed information of the issue to a cloud-based service on a machine-learning server; and
         receive, from the machine-learning server, a relevant solution based on previous history of similar field devices.

2. The apparatus of claim 1, wherein the processor is further configured to:
   identify an object related to the field device;
   receive a command for a document type; and
   display a document corresponding the document type of the identified object.

3. The apparatus of claim 1, wherein, when the relevant solution does not resolve the issue, the processor is further configured to:
   request the machine-learning server to connect to a subject matter expert; and
   receive expert report for resolving the issue from the subject matter expert.

4. The apparatus of claim 3, wherein the processor is further configured to:
   provide a live feed from the optical sensor to the subject matter expert.

5. The apparatus of claim 4, wherein the processor is further configured to:
   receive, from the subject matter expert, instructions for resolving the issue, wherein the instructions include identification of components in the live feed; and
   display, on the display, a marker on the components identified corresponding to specific operations in the instructions.

6. The apparatus of claim 1, wherein the processor is further configured to:
   log an issue type and a resolve procedure based on the necessary steps or actions with the machine-learning server.

7. A method on using a chatbot application for interactive communication between a user, system, and remote support, the method comprising:
   receiving diagnostic information from a server related to a field device in an industrial process control and automation system;
   identifying an issue of the field device based on the diagnostic information;
   detecting, using an optical sensor, the field device corresponding to the identified issue;
   guiding, using a display, a user to a location and a scanner part of the field device that is related to the issue;
   providing, using the display, necessary steps or actions to resolve the issue;
   connecting, using a cloud server, the user to get modules of installation, commissioning, annual maintenance (AMC) and training for a quality control system (QCS) as per a selected persona; and
   when the necessary steps or actions do not resolve the issue, the method further comprises:
      providing detailed information of the issue to a cloud-based service on a machine-learning server; and
      receiving, from the machine-learning server, a relevant solution based on previous history of similar field devices.

8. The method of claim 7, wherein the field device is a quality control system (QCS) scanner.

9. The method of claim 8, wherein, when the relevant solution does not resolve the issue, the method further comprises:
   requesting the machine-learning server to connect to a subject matter expert; and
   receiving expert report for resolving the issue from the subject matter expert.

10. The method of claim 9, wherein the method further comprises:

providing a live feed from the optical sensor to the subject matter expert.

11. The method of claim 10, wherein the method further comprises:
receiving, from the subject matter expert, instructions for resolving the issue, wherein the instructions include identification of components in the live feed; and
displaying, on the display, a marker on the components identified corresponding to specific operations in the instructions.

12. The method of claim 7, wherein the method further comprises:
logging an issue type and a resolve procedure based on the necessary steps or actions with the machine-learning server.

13. A non-transitory machine-readable medium encoded with executable instructions that, when executed, cause one or more processors to:
receive diagnostic information from a server related to a field device in an industrial process control and automation system;
identify an issue of the field device based on the diagnostic information;
detect, using an optical sensor, the field device corresponding to the identified issue;
guide, using a display, a user to a location and a scanner part of the field device that is related to the issue;
provide, using the display, necessary steps or actions to resolve the issue;
connect, using a cloud server, the user to get modules of installation, commissioning, annual maintenance (AMC) and training for a quality control system (QCS) as per a selected persona; and
when the necessary steps or actions do not resolve the issue, the instructions further cause the one or more processors to:
provide detailed information of the issue to a cloud-based service on a machine-learning server; and
receive, from the machine-learning server, a relevant solution based on previous history of similar field devices.

14. The non-transitory machine-readable medium of claim 13, wherein the field device is a quality control system (QCS) scanner.

15. The non-transitory machine-readable medium of claim 13, wherein, when the relevant solution does not resolve the issue, the instructions further cause the one or more processors to:
request the machine-learning server to connect to a subject matter expert; and
receive expert report for resolving the issue from the subject matter expert.

16. The non-transitory machine-readable medium of claim 15, wherein the instructions further cause the one or more processors to:
provide a live feed from the optical sensor to the subject matter expert.

17. The non-transitory machine-readable medium of claim 16, wherein the instructions further cause the one or more processors to:
receive, from the subject matter expert, instructions for resolving the issue, wherein the instructions include identification of components in the live feed; and
display, on the display, a marker on the components identified corresponding to specific operations in the instructions.

* * * * *